(No Model.) 2 Sheets—Sheet 1.
F. C. SOPER.
VENTILATED PRISM.
No. 595,272. Patented Dec. 7, 1897.
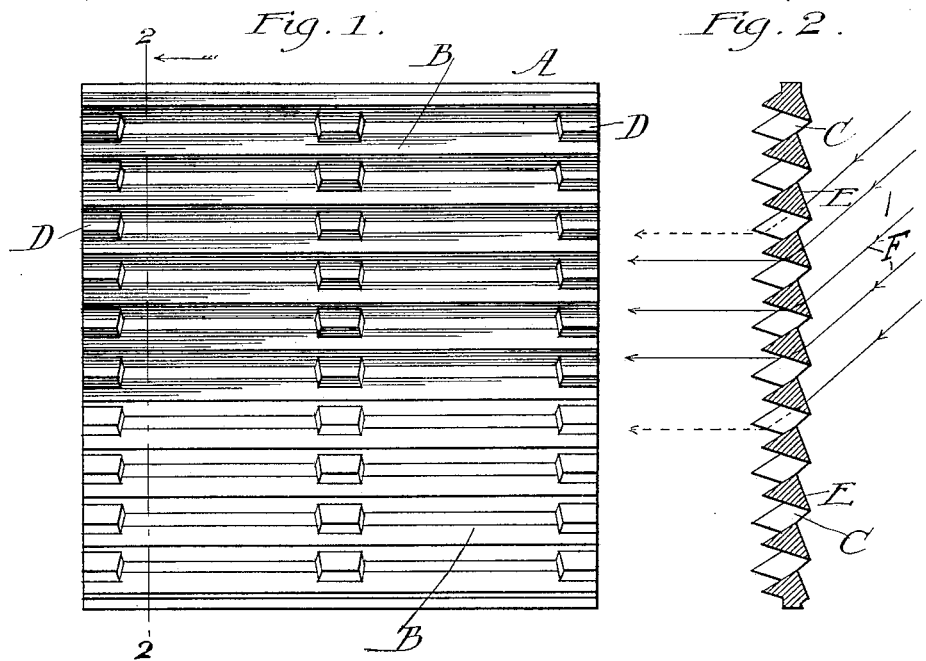
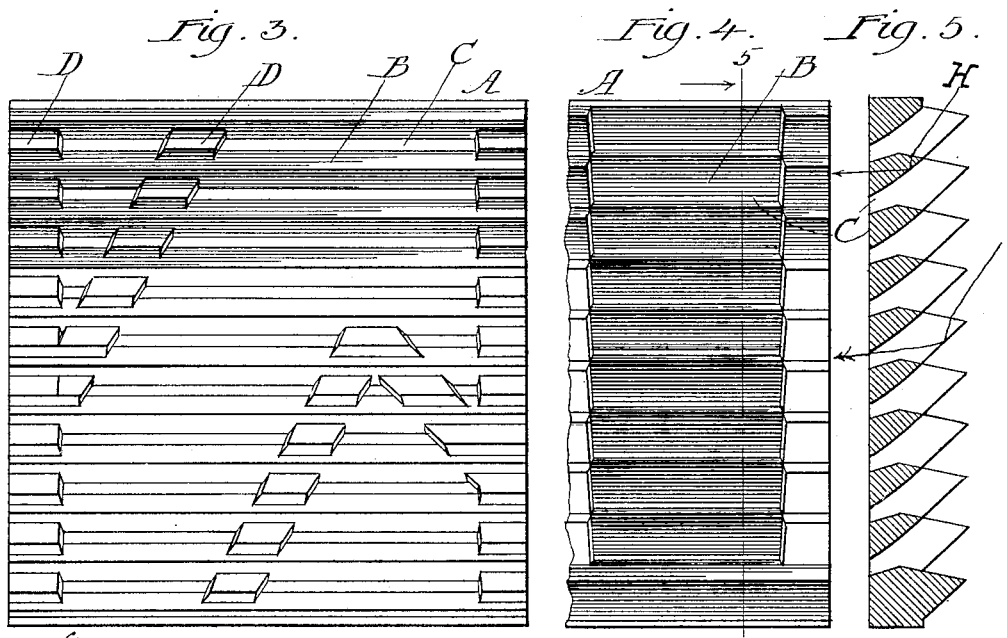
Witnesses:
Frank S. Blanchard
Donald M. Carter
Inventor:
Frank C. Soper (No Model.) 2 Sheets—Sheet 2.
F. C. SOPER.
VENTILATED PRISM.
No. 595,272. Patented Dec. 7, 1897.
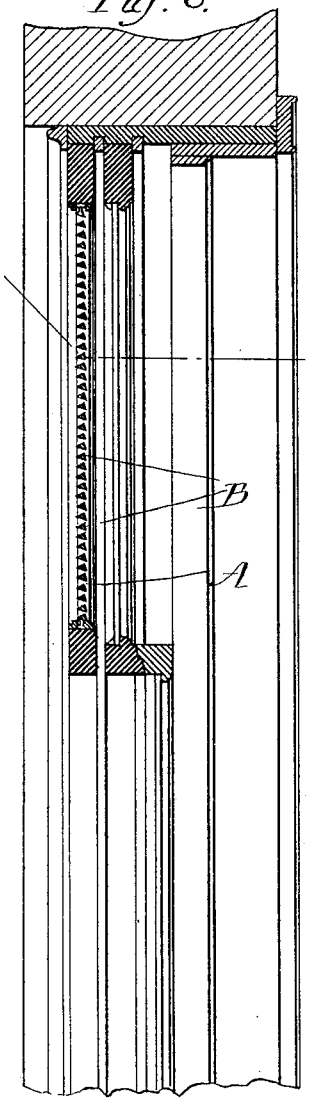
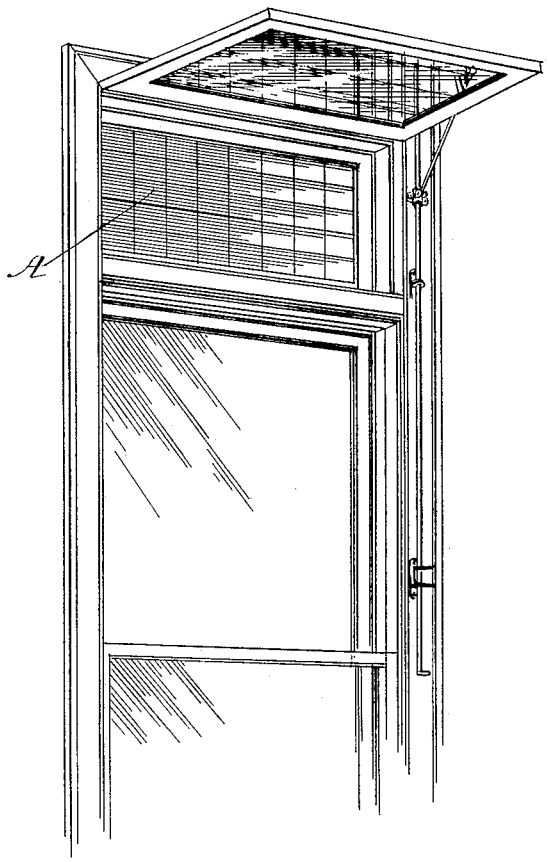
Witnesses:
Frank S. Blanchard
Donald M. Barter
Inventor:
Frank C. Soper.
THE NORRIS PETERS CO., PHOTO-LITHO., WASHINGTON, D. C.

UNITED STATES PATENT OFFICE.

FRANK C. SOPER, OF CHICAGO, ILLINOIS, ASSIGNOR TO THE LUXFER PRISM PATENTS COMPANY, OF SAME PLACE.

VENTILATED PRISM.

SPECIFICATION forming part of Letters Patent No. 595,272, dated December 7, 1897.

Application filed September 7, 1897. Serial No. 650,699. (No model.)

*To all whom it may concern:*

Be it known that I, FRANK C. SOPER, a citizen of the United States, residing at Chicago, in the county of Cook and State of Illinois, have invented certain new and useful Improvements in Ventilated Prisms, of which the following is a specification.

My invention relates to ventilating-prisms, and has for its object to provide a new and improved device consisting of a series of prisms connected together so as to allow ventilation.

My invention is illustrated in the accompanying drawings, wherein—

Figure 1 is a view of a ventilating prism-light. Fig. 2 is a section on line 2 2, Fig. 1. Fig. 3 shows a modified construction. Fig. 4 is a view of a modified construction with parts omitted. Fig. 5 is a section on line 5 5, Fig. 4. Fig. 6 shows a window provided with ventilating-prisms. Fig. 7 shows a transom provided with prisms embodying my invention.

Like letters refer to like parts throughout the several figures.

In Figs. 1 and 2 I have shown a prism-light A, provided with a series of prisms B, separated by the ventilating-openings C. These prisms or prism-bars are connected together by the pieces D, which are also preferably prisms, the whole constructed so as to be formed into an integral prism-light. These prism-lights may then be formed into prism-plates and placed in the window. It will be noted that the backs of the prisms are inclined, as shown at E, Fig. 2, the backs of the several prisms being in different planes. The prisms shown in Figs. 1, 2, and 3 are refracting-prisms, and as the light comes from the sky at an angle—say, for example, that shown by the line F—it strikes these several prisms so as to be refracted thereby. It will also be noted that the openings between the prisms are so formed and positioned that this light does not pass therethrough, and hence a ventilating prism-plate is obtained without reducing the light-receiving area. In other words, by this construction the prism-plate may be provided with ventilating-openings without reducing its efficiency in directing the light into the apartment. The parts D may be formed so as to produce any desired design and may be arranged in the prism-plate in any desired manner.

I have shown in Fig. 3, for example, an arrangement of a design different from that shown in Fig. 1. It is also evident that any suitable design may be formed in this manner.

In Figs. 4 and 5 I have shown a series of reflecting-prisms. In this case the prisms are to be placed on the outside when in position and act by reflection, the light received by the prisms being reflected into the apartment, as illustrated at H. It will be noted that the backs of the prisms in this instance are in the same plane.

I have only attempted to illustrate my invention sufficiently to make its application clear, and I therefore do not wish to be limited in any manner by the construction shown.

In using ventilating-prisms they may be placed in the window in the same manner as the ordinary prisms or they may be placed in an ordinary window, as shown, for example, in Fig. 6. In this figure the prisms are placed in the ordinary window, the illuminating effect of the prisms being obtained at all times, the ventilating effect being produced when the inside window is lowered. It will thus be seen that the ventilation can be controlled by means of the inside window.

In Fig. 7 I have shown my device in connection with a transom. The transom-opening is filled with ventilated prisms which produce the illuminating effect, the ventilating effect being obtained by opening the transom, as shown.

In Fig. 6 I have shown only part of the window as filled with the prisms; but it is of course evident that the entire window may be provided with these prisms, if desired. As before stated, the prisms may be either reflecting or refracting or both reflecting and refracting. The reflecting-prisms are particularly adapted to be used when the light-rays are received forming a large angle to the horizontal.

I claim—

1. A ventilating prism-light, comprising a series of prism-bars separated by ventilating-spaces, a series of shorter intermediate prisms integral therewith and connecting the prism-bars so as to form a prism-light.

2. A ventilating prism-light comprising a series of prism-bars separated by ventilating-spaces, and a series of shorter intermediate parts integral therewith and connecting the prism-bars so as to form a prism-light.

3. A ventilating prism-light comprising a series of prism-bars separated by ventilating-spaces, a series of shorter intermediate bars integral therewith, and connecting the ends of the prism-bars, and a series of short bars integral with the prism-bars and intermediate between the end bars and the prism-bars so as to form a complete prism-light.

FRANK C. SOPER.

Witnesses:
DONALD M. CARTER,
BERTHA C. SIMS.